(12) United States Patent
Fonte et al.

(10) Patent No.: US 11,867,105 B2
(45) Date of Patent: Jan. 9, 2024

(54) EXHAUST GAS JOULE HEATER

(71) Applicant: JOHNSON MATTHEY PUBLIC LIMITED COMPANY, London (GB)

(72) Inventors: Carlos Fonte, Royston (GB); Gregory Gregori, Royston (GB); Nigel Jones, Royston (GB); Chris Morgan, Royston (GB); Daniel Oakes, Royston (GB); Timothy O'Connell, Royson (GB)

(*) Notice: Subject to any disclaimer, the term of this patent is extended or adjusted under 35 U.S.C. 154(b) by 0 days.

(21) Appl. No.: 18/156,525

(22) Filed: Jan. 19, 2023

(65) Prior Publication Data
US 2023/0332524 A1 Oct. 19, 2023

Related U.S. Application Data

(63) Continuation of application No. 17/249,875, filed on Mar. 17, 2021, now abandoned.

(60) Provisional application No. 63/002,396, filed on Mar. 31, 2020.

(51) Int. Cl.
*F01N 3/28* (2006.01)
*F01N 3/027* (2006.01)
*F01N 3/022* (2006.01)
*F01N 3/10* (2006.01)
*F01N 3/20* (2006.01)

(52) U.S. Cl.
CPC ........... *F01N 3/027* (2013.01); *F01N 3/0222* (2013.01); *F01N 3/101* (2013.01); *F01N 3/103* (2013.01); *F01N 3/2066* (2013.01); *F01N 2240/16* (2013.01)

(58) Field of Classification Search
CPC ...... F01N 3/2026; F01N 3/0222; F01N 3/027; F01N 3/035; F01N 2240/16; F01N 2510/06; F01N 3/2013
USPC .......................................................... 219/553
See application file for complete search history.

(56) References Cited

U.S. PATENT DOCUMENTS

| | | | | |
|---|---|---|---|---|
| 4,456,457 | A | * 6/1984 | Nozawa | F01N 3/027 55/482 |
| 4,523,935 | A | * 6/1985 | Takagi | F01N 3/027 219/205 |
| 4,548,625 | A | 10/1985 | Ishida | F01N 3/027 60/303 |
| 4,662,911 | A | 5/1987 | Hirayama | F01N 3/027 55/482 |
| 4,723,973 | A | 2/1988 | Oyobe | F01N 3/027 60/303 |
| 5,144,798 | A | 9/1992 | Kojima | F01N 3/027 60/303 |
| 5,146,743 | A | 9/1992 | Maus et al. | |
| 5,393,499 | A | * 2/1995 | Bagley | H05B 3/141 422/177 |
| 5,433,926 | A | 7/1995 | Swars | F01N 13/009 422/174 |

(Continued)

FOREIGN PATENT DOCUMENTS

| | | | |
|---|---|---|---|
| EP | 0579415 A1 | 1/1994 | |
| FR | 3080148 A1 | 10/2019 | |
| WO | WO-2004112433 A1 | 12/2004 | ........... B23K 1/0008 |

*Primary Examiner* — Jonathan R Matthias (57) ABSTRACT

An apparatus for the catalytic treatment of gas having a casing and a catalytic article within the casing wherein the catalytic article comprises a ceramic honeycomb monolith which hosts a metallic track containing at least one platinum group metal (PGM).

12 Claims, 8 Drawing Sheets

(56) References Cited

U.S. PATENT DOCUMENTS

| | | | |
|---|---|---|---|
| 5,458,673 A | 10/1995 | Kojima | F01N 9/002 55/288 |
| 5,716,586 A | 2/1998 | Taniguchi | F01N 3/0238 422/174 |
| 6,513,324 B2 | 2/2003 | Bruck et al. | |
| 8,763,378 B2* | 7/2014 | Gonze | F01N 3/027 60/299 |
| 10,927,736 B2* | 2/2021 | Stiglmair | F01N 3/2803 |
| 11,168,596 B2 | 11/2021 | Aufranc | H05B 3/06 |
| 11,480,085 B2* | 10/2022 | Viault | F01N 3/2013 |
| 2007/0137186 A1 | 6/2007 | Igarashi | F01N 3/031 60/297 |
| 2008/0229931 A1* | 9/2008 | Katsuyama | B01D 46/2418 428/116 |
| 2010/0287912 A1 | 11/2010 | Gonze | F01N 3/027 60/287 |
| 2011/0214414 A1* | 9/2011 | Gonze | F01N 3/027 60/276 |
| 2012/0117946 A1 | 5/2012 | Gonze | F01N 3/22 60/297 |
| 2013/0043236 A1 | 2/2013 | Sakashita | F01N 3/2026 219/553 |
| 2017/0276047 A1* | 9/2017 | Takase | B01D 53/9454 |
| 2019/0126722 A1 | 5/2019 | Ishikawa | F02D 29/02 |
| 2019/0316507 A1 | 10/2019 | Ottaviani | B01D 53/94 |
| 2020/0309006 A1 | 10/2020 | Gidney | F01N 3/2066 |
| 2021/0123369 A1* | 4/2021 | Sommier | F01N 3/2807 |
| 2022/0220876 A1* | 7/2022 | Ottaviani | F01N 3/2013 |

* cited by examiner

FIG. 15

EXHAUST GAS JOULE HEATER

FIELD OF THE INVENTION

The present invention relates to an apparatus and method for catalytically treating exhaust gas from an internal combustion engine. The present invention further relates to a vehicle comprising such an apparatus.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Emission control systems are widely utilized to reduce the amount of these pollutants emitted to atmosphere. Conventional emissions control systems (e.g. catalysts such as three-way catalysts or diesel oxidation catalysts) include a catalytic substrate. Typically, such catalytic substrates are ceramic substrates (e.g. a ceramic honeycomb monolith substrate) or metallic substrates coated with a catalytic material. Alternatively, the substrate itself may be composed of catalytic material (e.g. an extruded catalyst). Typically, such emission control systems achieve very high efficiencies once they reach their operating temperature (typically, 200° C. and higher). However, these systems are relatively inefficient below their operating temperature, such as during the "cold start" period.

As even more stringent national and regional legislation lowers the amount of pollutants that can be emitted from diesel or gasoline engines, reducing emissions during the cold start period is becoming a major challenge. Thus, methods for reducing the level of NOx and hydrocarbons emitted during cold start conditions continue to be explored.

One way of addressing the challenges encountered during the cold start period is to employ an electrically heated catalyst (EHC), which preheats the catalyst and thereby speeds up the onset of the catalytic reactions. Such EHCs may be positioned upstream of a conventional catalytic monolith.

Commercially available EHCs typically comprise metallic honeycomb substrates, which may be coated with catalytic material. Typically, such EHC's comprise a first metallic honeycomb substrate, which functions as a heating element, affixed to a second metallic honeycomb substrate of higher resolution (i.e. higher number channels per square inch). The heating element is affixed to the second honeycomb substrate by way of one or more electrically insulating support elements. However, the presence of such support elements reduces the geometric surface area of honeycomb available for coating with a catalytic material, and consequently limits the surface area of catalytic material available to take part in the catalytic treatment of exhaust gas.

Further, such EHC's may be complex and expensive to manufacture.

Examples of electrically heatable substrates are described in U.S. Pat. Nos. 5,146,743 and 6,513,324.

EP 0579415 relates to an apparatus for use in an engine exhaust system containing a catalyst and a non-catalytic heater upstream of the catalyst. The heater has at least 15 heated channels per square centimetre, the heated channels being less than 1.0 cm in length, so that in operation the exhaust gas passes through the channels and is thereby heated before it reaches the catalyst, the heater being such that the heated gas leaving the channels has at least to some extent turbulent flow. The heater may be resistance heated by electrical power and the channels of the heater are preferably provided by one or more heated wire gauzes.

There remains a need for improved systems which address the challenges encountered during the cold start period.

SUMMARY OF THE INVENTION

According to some aspects of the present invention, an exhaust gas heater includes an electrically conductive metallic track hosted on an electrically insulating substrate through which an exhaust gas can flow. In some aspects, the substrate may have a tubular and/or cylindrical shape. The substrate may include a plurality of channels extending through the substrate. In some aspects, the substrate comprises a honeycomb monolith. In some aspects, the substrate comprises a filter.

The metallic track may comprise metal on an inlet end surface of the substrate. In some aspects, the metallic track comprises metal on an outlet end surface of the substrate. The metallic track may comprise an electrically conductive metal or metal alloy. In some aspects, the metallic track comprises silver, gold, platinum, rhodium, ruthenium, iron, chromium, titanium or an alloy of one or more thereof. In some aspects, the metallic track comprises silver. The metallic track may further include an alternative metal to tune resistance properties. In certain aspects, the metallic track comprises silver and nichrome. The silver and nichrome may be present in a weight ratio within a range of 5:1 to 1:5. In some aspects, the metallic track comprises silver and stainless steel. The silver and stainless steel may be present in a weight ratio within a range of 5:1 to 1:5. In some aspects, the silver comprises silver oxide. In some aspects, the silver comprises silver paste.

The metallic track may comprise metal within a trench in an end surface of the substrate. In such aspects, the metal may be coated into the trench.

The heater may also include connectors linking the metal to an electrical power supply.

In some aspects, the substrate may include a catalytic material. Suitable catalytic material may include but are not limited to a lean NOx catalyst (LNC), a selective catalytic reduction (SCR) catalyst, a diesel oxidation catalyst (DOC), an ammonia slip catalyst (ASC), a cold start catalyst (dCSC), a three-way catalyst (TWC), or combinations thereof. In some aspects, the catalytic material is coated on the substrate. In some aspects, the catalytic material is coated on an outlet end of the substrate. In some aspects, the catalytic material is included within the substrate.

According to certain aspects of the present invention, an apparatus for the catalytic treatment of exhaust gas from an internal combustion engine includes:

a. a casing having an exhaust gas inlet and a treated exhaust gas outlet; and b. a heater disposed within the casing, through which the exhaust gas can flow;

wherein the heater comprises an electrically conductive metallic track hosted on an electrically insulating substrate.

In some aspects, the apparatus further comprises a catalyst article disposed within the casing adjacent to the heater, through which exhaust gas can flow. In some aspects, the catalyst article may be disposed downstream of the heater. In some aspects, the heater substrate comprises a catalytic material. The catalytic material may comprise, for example, a lean NOx catalyst (LNC), a selective catalytic reduction (SCR) catalyst, a diesel oxidation catalyst (DOC), an ammonia slip catalyst (ASC), a cold start catalyst (dCSC), a three-way catalyst (TWC), or combinations thereof. In some aspects, the catalytic material is coated on the substrate, such as on an outlet end of the substrate, and/or the catalytic material is included within the substrate.

In some aspects, the casing comprises a metallic sleeve.

In some aspects, the catalyst article comprises a diesel particulate filter (DPF), a lean NOx trap (LNT), a lean NOx catalyst (LNC), a selective catalytic reduction (SCR) catalyst, a diesel oxidation catalyst (DOC), a catalyzed soot filter (CSF), a selective catalytic reduction filter (SCRF™) catalyst, an ammonia slip catalyst (ASC), a cold start catalyst (dCSC), a gasoline particulate filter (GPF), a three-way catalyst (TWC), or combinations thereof.

In some aspects, the electrically insulating substrate comprises ceramic, such as alumina, cordierite, aluminium titanate, silicon carbide, mullite, zirconia, or mixtures thereof. In some aspects, the ceramic comprises alumina.

According to some aspects of the present invention, a method of catalytically treating an exhaust gas from an internal combustion engine, may include passing the exhaust gas through an apparatus comprising:
  a. a casing having an exhaust gas inlet and a treated exhaust gas outlet; and
  b. a heater disposed within the casing, through which the exhaust gas can flow;
  wherein the heater comprises an electrically conductive metallic track hosted on an electrically insulating substrate. In some aspects, the exhaust gas is an exhaust gas from a vehicular diesel engine.

According to some aspects of the present invention, a vehicle includes an internal combustion engine and an apparatus for the catalytic treatment of exhaust gas from the internal combustion engine, which apparatus comprises:
  a. a casing having an exhaust gas inlet and a treated exhaust gas outlet; and
  b. a heater disposed within the casing, through which the exhaust gas can flow;
  wherein the heater comprises an electrically conductive metallic track hosted on an electrically insulating substrate. In some aspects, the internal combustion engine is a diesel engine.

DETAILED DESCRIPTION OF THE INVENTION

The present invention will now be further described. In the following passages different aspects of the invention are defined in more detail. Each aspect so defined may be combined with any other aspect or aspects unless clearly indicated to the contrary. It is intended that the features disclosed in relation to the apparatus may be combined with those disclosed in relation to the method and vice versa.

An exhaust gas heater of aspects of the present invention may include an electrically conductive metallic track hosted on an electrically insulating substrate through which an exhaust gas can flow.

Substrate

Heaters of the present invention include an electrically insulating substrate through which an exhaust gas can flow, and which can host an electrically conductive metallic track. A substrate may have any size and shape that is suitable for the particular exhaust system for which the substrate is intended. In some aspects, a substrate may have a tubular shape. In some aspects, a substrate may have a cylindrical shape. In some aspects, a substrate has a cross-section that is circular, oval, racetrack, square, or 'tv'-shaped. In some aspects, a substrate may have an open center channel. In some aspects, a substrate may have a plurality of channels extending through the substrate such as a honeycomb substrate. In some aspects, a substrate may have a spiral channel pattern. In some aspects, the substrate may have a channel pattern of parallel bars. In some aspects, a substrate may comprise a filter.

In some aspects, a suitable substrate an outer diameter of about 6 mm to about 70 mm; about 6 mm to about 60 mm; about 6 mm to about 50 mm; about 40 mm to about 70 mm; about 50 mm to about 60 mm; about 6 mm to about 14 mm; about 8 mm to about 12 mm; about 9 mm to about 11 mm; about 6 mm; about 7 mm; about 8 mm; about 9 mm; about 10 mm; about 11 mm; about 12 mm; about 13 mm; about 14 mm; about 15 mm; about 17 mm; about 20 mm; about 25 mm; about 30 mm; about 35 mm; about 40 mm; about 45 mm; about 50 mm; about 55 mm; about 60 mm; about 65 mm; or about 70 mm.

The substrate may have an inlet end and an outlet end, with the inlet and outlet being defined relative to the direction of flow of the exhaust gas.

The substrate may be electrically insulating and thus may be made from any suitable electrically insulating material which is sufficiently resilient or tough to resist abrasion from exhaust particulates during operation. Preferably, the substrate comprises ceramic which is electrically non-conductive.

Preferably, the substrate comprises a porous material. For example, the substrate may comprise a porous ceramic material. In some aspects, the substrate may comprise a material having a porosity in the range of 10 to 75%, for example, 30 to 70%.

Advantageously, the substrate may comprise a material which is heat-transmissive, such that the substrate itself becomes heated when exposed to resistive heat generated in use by the resistive metallic track.

Where the substrate comprises a ceramic material, the ceramic substrate may comprise any suitable ceramic material. Suitable ceramic materials include alumina (for example, alpha-alumina), cordierite, aluminium titanate, silicon carbide, mullite, zirconia (for example, ytrria-stabilised zirconia) or mixtures thereof. Preferably, the substrate comprises a ceramic material comprising alpha alumina.

In some aspects, the substrate may itself be catalytic. For example, the substrate may comprise or be coated with a catalytic material. In a preferred embodiment, the substrate comprises a ceramic material coated with a catalytic material.

Advantageously, where the substrate is catalytic shorter periods of resistance heating may be required to achieve light-off of a downstream catalyst article compared to an apparatus where a non-catalytic heater is positioned upstream of a catalyst article.

The catalytic material may be a catalyst suitable for catalyzing the conversion of one or more of the components of the exhaust gas. For example, the catalytic material may comprise an oxidation catalyst, such as a diesel oxidation catalyst, an SCR catalyst, a three-way catalyst composition, or an ammonia slip catalyst. Preferably, the catalyst material comprises an oxidation catalyst or a three-way catalyst.

Alternatively, where the substrate takes the form of a static mixer for use in an SCR process, the catalytic material preferably comprises a catalyst suitable for catalyzing the conversion of urea to form ammonia. In some aspects, preferable catalytic materials comprise high surface area inorganic oxides, titania, zirconia, and/or zeolites.

Where the substrate is made of a ceramic material, the substrate may be prepared by extrusion, optionally followed by washcoating to apply a coating of catalytic material. To produce an extruded article, a ceramic extrusion composition whose rheological properties have been set so as to be suitable for the extrusion process is generally provided. This extrusion composition is a plastic (i.e. easily shaped or moldable), viscous composition. To set the desired rheological properties of the extrusion composition, organic additives are typically added to the extrusion composition. The resulting plastic material is then molded, for example, using an extrusion press or an extruder including an extrusion die, and the resulting moldings are dried and calcined. The organic additives are "burnt out" during calcination of the extrudate. Where is it desired that the substrate itself comprises catalytic material (as opposed or in addition to being coated with a catalytic material), catalytically active component is also present in the extrusion composition.

Alternatively, the substrate may be prepared by additive layer manufacturing.

Additive layer manufacturing (ALM) is a technique whereby 2-dimensional layers (2D) of material are sequentially laid down and fused or bound together to fabricate a 3-dimensional (3D) solid object (i.e. a shaped unit). ALM may also be referred to as Additive Manufacturing (AM), 3D-printing, freeform fabrication and/or digital fabrication. ALM processes are enabled by conventional 3D design computer packages that allow design of the shaped unit as a so-called "CAD file" which is a simple mesh depiction of the 3D shape. Using the design software, the CAD file is digitally cross-sectioned into multiple two-dimensional slices, which are the basis for the fabrication process. The fabrication equipment, reading the two-dimensional pattern, then sequentially deposits layer upon layer of material corresponding to the 2D slices. In order that the shaped unit has structural integrity, the material is bound, cured, or fused together as the layers are deposited. The process of layer deposition and binding/fusion is repeated until the required 3D shaped unit is generated. Typically, the 3D shaped unit will then undergo a sintering step which causes the particles of the printed material to fuse together and become densified, thereby providing an article with increased strength.

A particular advantage of employing ALM techniques to manufacture the substrate, is that a substrate may be prepared having intricate design features, such as grooves, notches or apertures suitable for supporting, holding, and/or attaching to an electrically conductive metallic track and/or wire. Such features may be more difficult to achieve using extrusion methods.

Various ALM techniques may be suitable for manufacturing the substrate of the present invention, for example, powder bed techniques such as material-jetting, binder-jetting and powder bed fusion, stereolithography and three-dimensional screen printing.

Metallic Track

Once a suitable substrate has been prepared, the electrically conductive metallic track may be applied thereon. The metallic track may be applied, for example, as a paste. In some aspects, the conductive metallic track is applied on an inlet end surface or an outlet end of the substrate. In some aspects, the substrate includes a trench in an inlet end surface or an outlet end, and the metallic track is coated as a paste within the trench. The paste is dried and sintered. In some aspects, sintering takes place in air at temperatures up to about 650° C.

An electrically conductive metallic track may have any suitable size to provide the desired effect for the particular substrate and/or apparatus. In some aspects, a metallic track has a width of about 1 mm to about 6 mm; about 2 mm to about 5 mm; about 2 mm to about 4 mm; or about 3 mm.

As used herein, the term "electrically conductive metallic track" refers to a metallic track comprising an electrically conductive material which generates heat on the flow of an electrical current therethrough. The heat generated on the metallic track may heat the substrate upon which the track is hosted, and thereby heat the exhaust gas flowing through the substrate.

The resistance of the electrically conductive metallic track may be in the range 0.0005 to 20 ohm, preferably 0.1 to 10 ohm.

In some aspects, a conductive metallic track comprises an electrically conductive metal or metal alloy. In some aspects, a resistive metallic track comprises silver, gold, platinum, rhodium, ruthenium, iron, chromium, titanium or an alloy of one or more thereof. In some aspects, a conductive metallic track further comprises an alternative metal to tune resistance properties. In some aspects, the resistive metallic track comprises silver and a resistive metal. In some aspects, the resistive metallic track comprises silver and nichrome. In some aspects, the resistive metallic track comprises silver and stainless steel. In some aspects, the silver comprises silver oxide. In some aspects, the silver comprises silver paste.

In some aspects, the metallic track comprises silver and a resistive metal in a weight ratio of about 5:1 to about 1:5; about 1:1 to about 1:5; about 1:1 to about 1:6; about 1:1; about 1:2; about 1:3; about 1:4; or about 1:5. In some aspects, the metallic track comprises silver paste and nichrome in a weight ratio of about 1:4 or about 1:5. In some aspects, the metallic track comprises silver paste and stainless steel in a weight ratio of about 1:3.

In some aspects, silver and stainless steel may be present in a weight ratio within a range of about 5:1 to about 1:5; about 4:1 to about 1:4; about 3:1 to about 1:3; about 2:1 to about 1:2; or about 1:1. In some aspects, silver and nichrome may be present in a weight ratio within a range of about 5:1 to about 1:5; about 4:1 to about 1:4; about 3:1 to about 1:3; about 2:1 to about 1:2; or about 1:1.

Prior to applying the metallic track, the substrate may undergo a washcoating process to apply a coating comprising catalytic material. Alternatively, where ALM is employed, the substrate may be manufactured to include an electrically conductive metallic track.

The heater may further comprise means for supplying an electrical current to the electrically conductive metallic track, in order that heat is generated in use. The heater may therefore comprise suitable electrical power connections for providing a flow of electrical current through the electrically conductive metallic track. For example, the casing may comprise an electrically insulating supporting element for each electrical power connection. Each electrical power connection may pass through an electrically insulating supporting element.

An apparatus may further comprise means to turn on and off the supply of electrical power to the wire. For example, where the apparatus is employed in a vehicle comprising an internal combustion engine, the apparatus may incorporate means to turn on the heater immediately before (e.g. 1-2 seconds before) or immediately after the engine is started. The apparatus preferably also comprises means to switch off the supply of electrical power to the wire once desired operating temperature is reached. A thermocouple may be employed to sense operating temperatures such that the supply of electrical power may be switched on and off as required.

Catalyst Article

In some aspects, an apparatus may include a catalyst article adjacent to the heater. In some aspects, the catalyst article may comprise a substrate being coated with a washcoat comprising catalytic material. Alternatively, the catalyst may comprise a substrate which itself is composed of catalytic material (i.e. an extruded catalyst). As described above, the heater itself may comprise a substrate including a catalytic material; as used herein, the term "catalyst article" refers to a catalyst article that is in addition to the heater (whether or not the heater comprises a substrate including a catalytic material).

The catalyst article may, for example, comprise a flow-through substrate (e.g. a monolithic flow-through substrate) or a filter substrate (e.g. a monolithic wall-flow filter).

A flow-through substrate generally comprises a plurality of channels, typically extending therethrough, wherein each channel is open at both ends (i.e. an open end at the inlet and an open end at the outlet). The channels are formed between a plurality of walls. A flow-through monolithic substrate comprising an array of parallel channels extending may also be referred to as a honeycomb monolithic substrate.

By contrast, a filter substrate comprises a plurality of channels, wherein each channel has an open end and a closed end (e.g. a blocked or plugged end). Each channel is typically separated from an adjacent or neighboring channel by a wall. The wall comprises, or consists essentially of, a porous material.

Flow-through substrates and filter substrates are well known in the art.

The catalyst article may be a diesel particulate filter (DPF), a lean NOx trap (LNT), a lean NOx catalyst (LNC), a selective catalytic reduction (SCR) catalyst, a diesel oxidation catalyst (DOC), a catalyzed soot filter (CSF), a selective catalytic reduction filter (SCRF™) catalyst, an ammonia slip catalyst (ASC), a cold start catalyst (dCSC), a gasoline particulate filter (GPF) or a three-way catalyst (TWC). The catalyst article may be a zoned or layered catalyst, wherein different zones or layers may comprise different catalytic materials.

Where the catalyst article is an SCR catalyst, the heater may be positioned upstream of the catalyst article and the heater may take the form of a static mixer capable of disturbing the flow of exhaust gas. In such an embodiment, preferably, the apparatus further comprises a means for introducing urea or ammonia precursor into the casing at a position upstream of the heater.

Casing

An apparatus of aspects of the present invention may comprise a casing in which the heater and/or a catalyst article are disposed. The casing comprises an exhaust gas inlet and a treated exhaust gas outlet. The casing may comprise or consist essentially of a metallic sleeve. The casing may have one or more markings to denote the inlet end/and or the outlet end thereof. The casing may be axially circular or oval in cross-section. The casing has an axial length which is greater than or equal to the sum of the axial length of the heater and, when present, the axial length of the catalyst article.

In aspects including a catalyst article, the catalyst article is disposed adjacent to the heater and may be at a position which is upstream or downstream of the heater.

The term "adjacent" as used herein denotes that the catalyst article is disposed proximal to the heater within the casing. However, it does not necessarily require that the heater and the catalyst article are in physical contact one another; i.e., having abutting surfaces, though such an arrangement is not excluded.

By "upstream" it is meant a position which, in use, is closer to the engine manifold vis-a-vis the flow of the exhaust gas leaving the engine (i.e. closer to the exhaust gas inlet of the casing), and by "downstream" the converse meaning is intended. In aspects including a catalyst article, the catalyst article may preferably be disposed within the casing at a position downstream of the heater. Thus, exhaust gas entering the apparatus via the inlet of the casing will first contact the heater prior to contacting the catalyst article.

By positioning a heater upstream of a catalyst article, exhaust gas may be heated prior to its contact with the catalyst article, and thus, "light-off" of the catalyst article (i.e. the effective operating temperature) may be achieved faster. Operation of the heater may therefore be advantageous under cold-start conditions, or conditions where the catalyst article may cool to a temperature below its effective operating temperature, such as during idling of a vehicle or when used with a vehicle having an engine with stop/start mode. Such benefits may also be realized when a heater comprises a substrate including a catalytic material.

In some aspects, a heater is positioned upstream of a catalyst. In some aspects, the metallic track is positioned on the inlet end of a substrate thereby heating the exhaust gas as it enters the substrate. Such positioning may provide benefits when the substrate is coated with a catalyst, and/or when a catalytic article is positioned downstream of the substrate. In some aspects, the metallic track is positioned on the outlet end of a substrate thereby heating the exhaust gas as it exits the substrate. Such positioning may provide benefits when the substrate is upstream of a subsequent catalytic article.

In some aspects, a gap may be present between the heater and a catalyst article, when included. The gap may have a length of from 1 mm to 50 mm, as measured in the direction of the axial length of the heater and the catalyst article. Alternatively, no gap may be present between the heater and a catalyst article.

The apparatus may comprise one or more further catalyst articles disposed within the casing. For example, the apparatus may comprise an SCR catalyst which is disposed within the casing downstream of the heater, followed by an ASC catalyst disposed with the casing downstream of the SCR catalyst.

In a preferred embodiment, the apparatus is employed in the exhaust system of a vehicle and the heater is powered by the vehicle's alternator and/or battery.

In use, the apparatus may be employed to treat exhaust gas from an internal combustion engine, such as a vehicular internal combustion engine. The vehicular internal combustion engine may comprise a diesel engine or a gasoline engine.

A further aspect of the invention is a method of treating an exhaust gas comprising passing the exhaust gas through the apparatus described above. Preferably, the exhaust gas is an exhaust gas from a vehicular diesel engine. A further aspect of the invention is a method of treating a gas for a compressed natural gas application.

A further aspect of the present invention is a vehicle comprising the apparatus described above. The vehicle may comprise an internal combustion engine selected from a diesel engine or a gasoline engine. Preferably, the vehicle comprises a diesel engine.

EXAMPLES

The invention will now be further described with reference to the following examples, which are illustrative, but not limiting of the invention.

Substrate A—Tube Substrate

Figure 1:
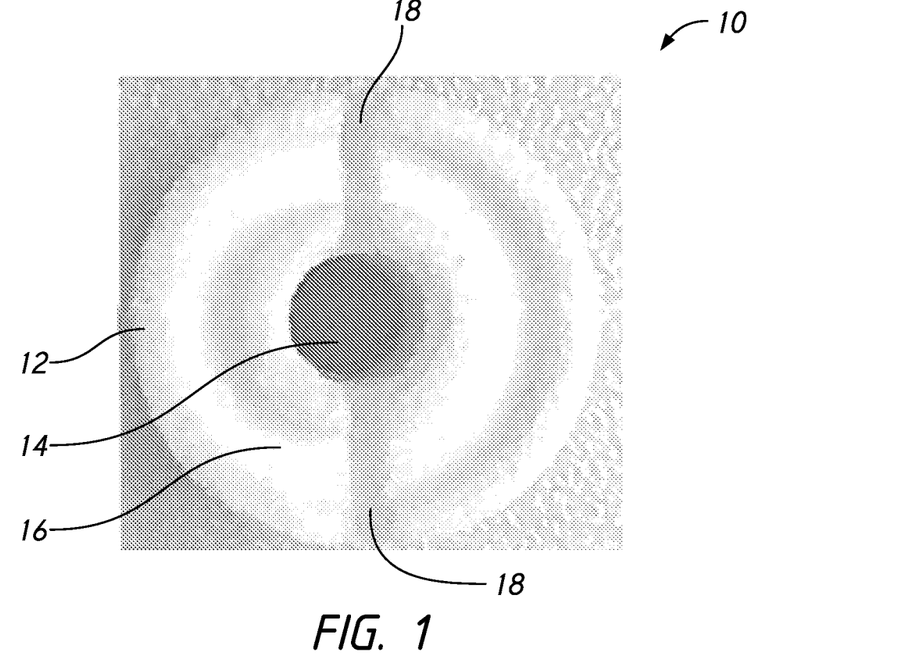
FIGS. 1-6 show diagrammatic representations of insulating substrates which may be employed in aspects according to the present invention.

Insulating substrate 10, as shown in FIG. 1, was prepared according to certain aspects described herein. FIG. 1 shows a view of inlet end 12 of insulating substrate 10 formed from an alumina/titania mixture using a binder-jet powder bed 3D printing technique. Insulating substrate 10 has a tubular shape including inner channel 14 through which an exhaust gas can flow. Insulating substrate 10 also includes trench 16 on the surface of inlet end 12. Trench 16 may be coated with an electrically conductive metal or paste to form a metallic track. Insulating substrate 10 includes depressions 18 which may support connectors linking the metal to an electrical power supply. Substrate 10 has outer diameter of 12 mm and inner diameter of the tube is 6 mm, and height of 30 mm. The circular trench width is 1 mm and depth is 3 mm. The depressions to accommodate tabs are 5 mm deep.

Substrate B

Figure 2:
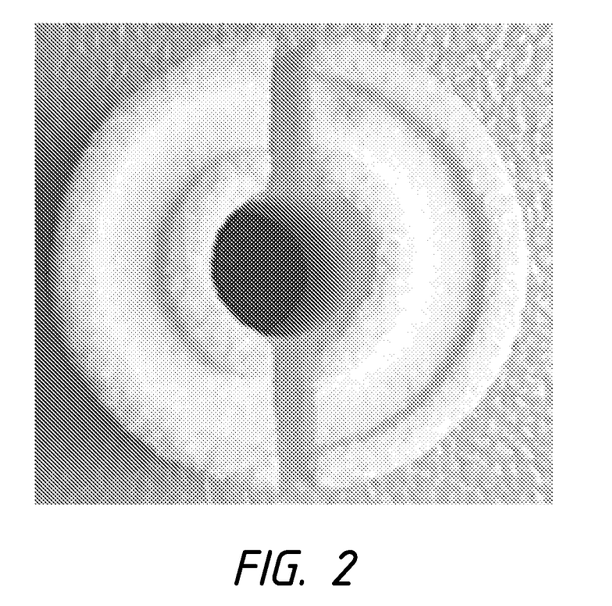

An insulating substrate, as shown in FIG. 2, was prepared according to certain aspects as described herein. FIG. 2 shows a view of the inlet end of an insulating substrate formed from an alumina/titania mixture using a binder-jet powder bed 3D printing technique. The insulating substrate has a tubular shape with outer diameter of 12 mm and inner diameter of the tube is 4 mm, and height of 30 mm. The circular trench width is 2 mm and depth is 1 mm. The depressions to accommodate tabs are 5 mm deep.

Substrate C

Figure 3:
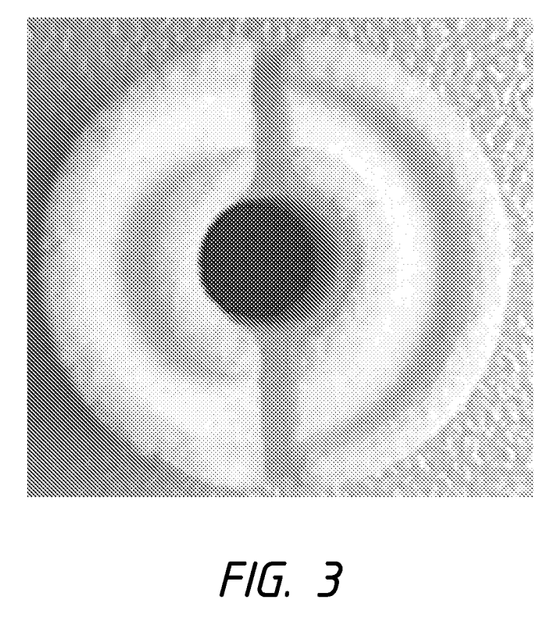

An insulating substrate, as shown in FIG. 3, was prepared according to certain aspects as described herein. FIG. 3 shows a view of the inlet end of an insulating substrate formed from an alumina/titania mixture using a binder-jet powder bed 3D printing technique. The insulating substrate has a tubular shape with outer diameter of 12 mm and inner diameter of the tube is 4 mm, and height of 30 mm. The circular trench width is 2 mm and depth is 2 mm. The depressions to accommodate tabs are 5 mm deep.

Substrate D

Figure 4:
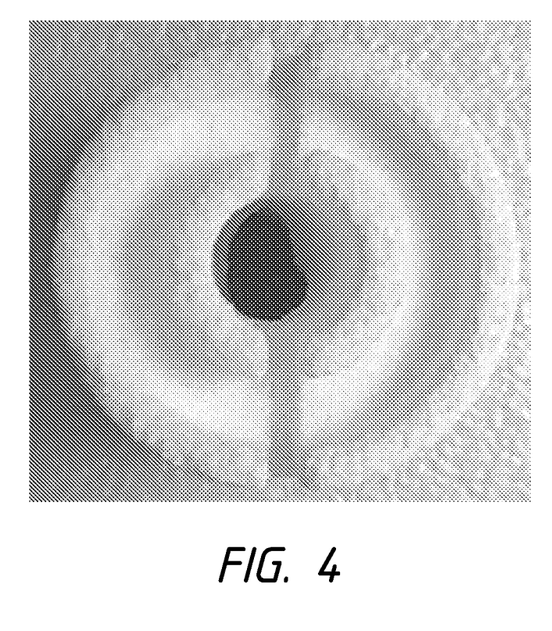

An insulating substrate, as shown in FIG. 4, was prepared according to certain aspects as described herein. FIG. 4 shows a view of the inlet end of an insulating substrate formed from an alumina/titania mixture using a binder-jet powder bed 3D printing technique. The insulating substrate has a tubular shape with outer diameter of 12 mm and inner diameter of the tube is 4 mm, and height of 30 mm. The circular trench width is 2 mm and depth is 3 mm. The depressions to accommodate tabs are 5 mm deep.

Substrate E—56 mm Spiral Substrate

Figure 5:
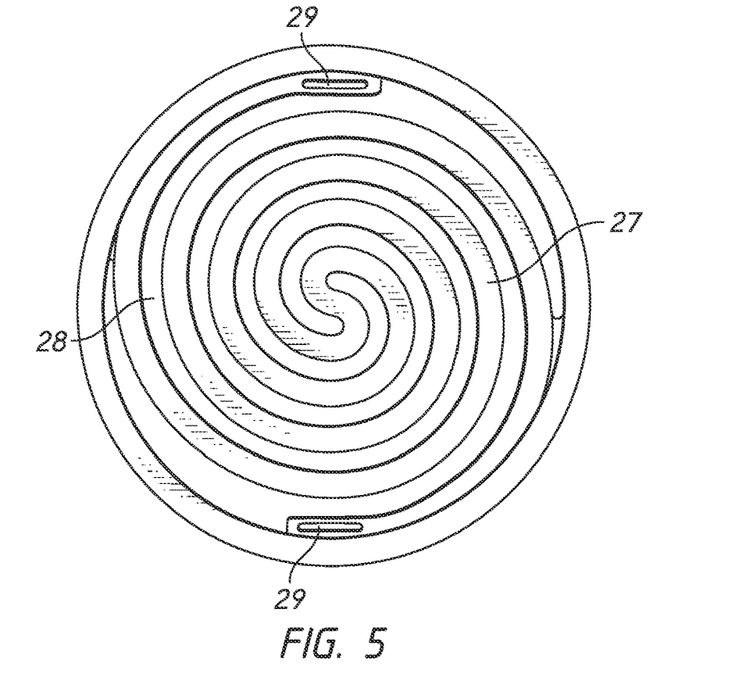

An insulating substrate, as shown as an image in FIG. 5, was prepared according to certain aspects as described herein. FIG. 5 shows a CAD view drawing of the inlet end of an insulating substrate formed from an alumina/titania mixture using a binder-jet powder bed 3D printing technique. The insulating substrate has a round shape of 56 mm outer diameter and 10 mm height. The substrate includes an inner serpentine spiral support bar 27, made from 4 loops meeting in the center, 3 mm thick with a 2 mm wide gap 28 through which an exhaust gas can flow. The insulating substrate also includes depressions 29 to support electrical connectors on the surface of inlet end.

Substrate F—56 mm Slotted Trench Substrate

Figure 6:
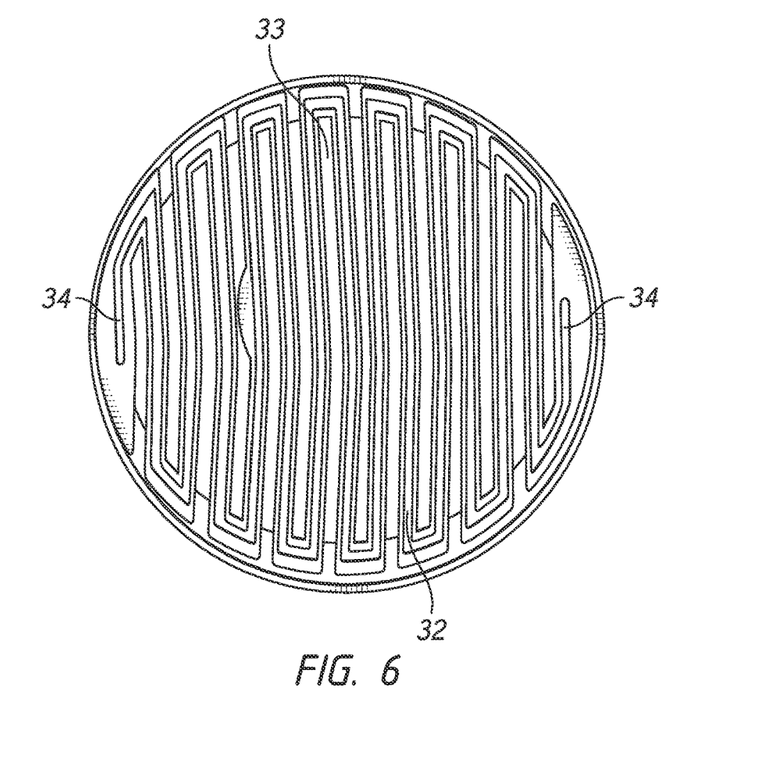

An insulating substrate, as shown in as an image in FIG. 6, was prepared according to certain aspects as described herein. FIG. 6 shows a CAD view of the inlet end of an insulating substrate formed from an alumina/titania mixture using a binder-jet powder bed 3D printing technique. The insulating substrate has a round shape of 56 mm outer diameter and 10 mm height. The substrate has a series of 13 connected parallel bars 32, 4 mm deep, running parallel to each other; the bars 32 are 2.4 mm wide and span the front face from one side to the other forming a continuous bar support with gaps 33 1 mm wide through which an exhaust gas can flow. The bars 32 host a trench 2.7 mm deep into which an electrically conductive coating may be applied. The Insulating substrate also includes depressions 34 to support electrical connectors on the surface of inlet side.

Heater A—Tube Heater

Figure 7:
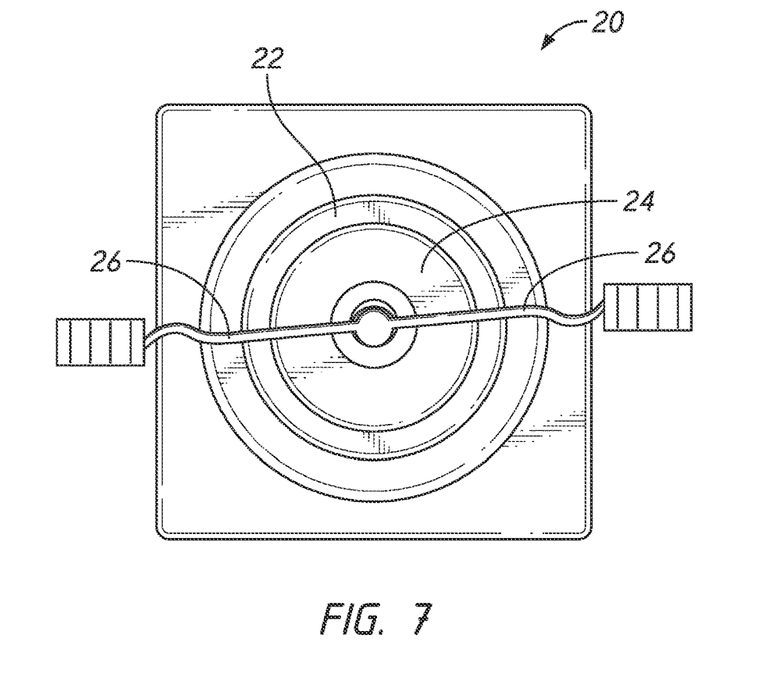
FIGS. 7-9 show heaters according to aspects to the present invention.

FIG. 7 shows heater 20, prepared according to certain aspects as described herein. Heater 20 includes insulating substrate 20 which has been coated with an electrically conductive metal in a trench on the surface of the inlet end to form metallic track 24. Heater 20 also include connectors 26 which are supported in depressions and link metallic track 24 to an electrical power supply.

Heater B1—56 mm Spiral Heater

Figure 8:
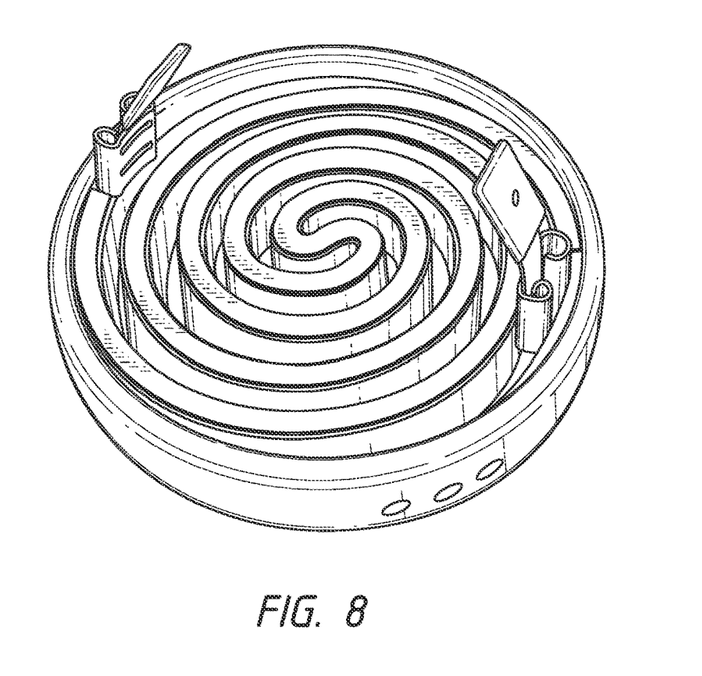

FIG. 8 shows a heater prepared according to certain aspects as described herein. The heater includes insulating spiral substrate E, described above, which has been coated with a conductive organic based paste composed of Ag flake, glass frit (Johnson Matthey Ltd) and steel metal powder (Goodfellow Cambridge Ltd.) and fired at 650° C. to form a continuous conductive track containing Ag paste and Steel powder in a 1:3 ratio on the surface of the inlet end to form a continuous conductive metallic track 30. The heater also includes connectors 31 which are supported in depressions and link the metallic track 30 to an electrical power supply.

Heater C1—56 mm Slotted Trench Substrate

Figure 9:
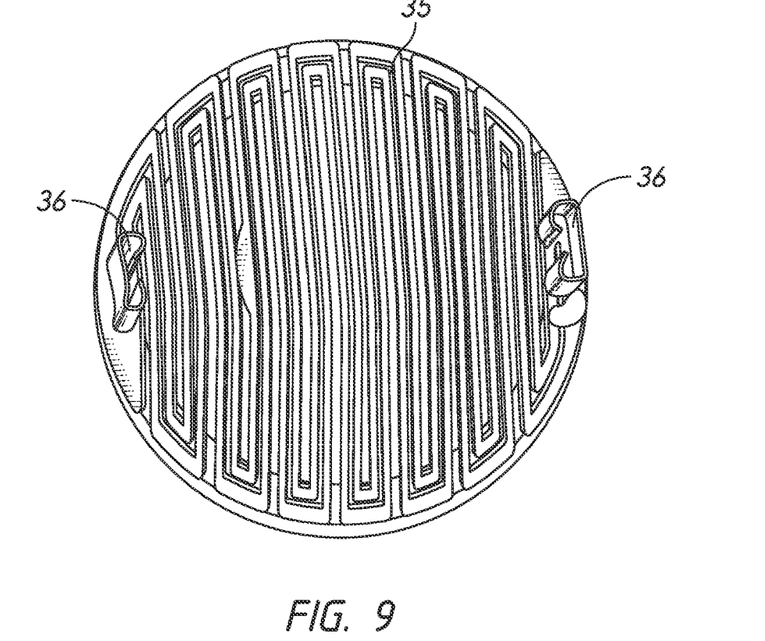

FIG. 9 shows a heater prepared according to certain aspects as described herein. The heater includes insulating slotted trench substrate F, described above, which has been coated with an electrically conductive metal with a conductive organic based paste composed of Ag flake, glass frit paste and steel metal powder (Goodfellow Cambridge Ltd.) powder in a 1:3 ratio and fired at 650° C. to form a continuous conductive track containing Ag paste and steel on the trench inner surface of the inlet end to form a continuous conductive metallic track 35. The heater also includes connectors 36 which are supported in depressions and link the metallic track 35 to an electrical power supply.

Example 3

A heater was prepared including insulating substrate A, as shown in FIG. 1. The trench 16 was filled with a conductive organic based paste composed of Ag flake, glass fit (Johnson Matthey Ltd.) and Nichrome metal powder (Goodfellow Cambridge Ltd.) and fired at 650° C. to form a continuous conductive track containing Ag paste and Nichrome powder in a 1:1 ratio.

Example 4

A heater was prepared including insulating substrate A, as shown in FIG. 1. The trench 16 was filled with a conductive organic based paste composed of Ag flake, glass frit (Johnson Matthey Ltd.) and Nichrome metal powder (Goodfellow Cambridge Ltd.) and fired at 650° C. to form a continuous conductive track containing Ag paste and Nichrome powder in a 1:2 ratio.

Example 5

A heater was prepared including insulating substrate A, as shown in FIG. 1. The trench 16 was filled with a conductive organic based paste composed of Ag flake, glass frit (Johnson Matthey Ltd.) and Nichrome metal powder (Goodfellow Cambridge Ltd.) and fired at 650° C. to form a continuous conductive track containing Ag paste and Nichrome powder in a 1:3 ratio.

Example 6

A heater was prepared including insulating substrate B, bearing a trench depth of 1 mm, as shown in FIG. 2. The trench was filled with a conductive organic based paste composed of Ag flake, glass frit (Johnson Matthey Ltd.), and Nichrome metal powder (Goodfellow Cambridge Ltd.) and fired at 650° C. to form a continuous conductive track containing Ag paste and Nichrome powder in a 1:4 ratio and applied coating mass of 0.1673 g.

Example 7

A heater was prepared including insulating substrate C, bearing a trench depth of 2 mm, as shown in FIG. 3. The trench was filled with a conductive organic based paste composed of Ag flake, glass frit (Johnson Matthey Ltd.), and Nichrome metal powder (Goodfellow Cambridge Ltd.) and fired at 650° C. to form a continuous conductive track containing Ag paste and Nichrome powder in a 1:4 ratio and applied coating mass of 0.3414 g.

Example 8

A heater was prepared including insulating substrate D bearing a trench depth of 3 mm, as shown in FIG. 4. The trench was filled with a conductive organic based paste composed of Ag flake, glass frit (Johnson Matthey Ltd.) and Nichrome metal powder (Goodfellow Cambridge Ltd.) and fired at 650° C. to form a continuous conductive track containing Ag paste and Nichrome powder in a 1:4 ratio and applied coating mass of 0.4974 g.

Example 9

A heater was prepared including insulating substrate C, bearing a trench depth of 2 mm as shown in FIG. 3. The trench was filled with a conductive organic based paste composed of Ag flake, glass frit (Johnson Matthey Ltd.), and Steel metal powder (Goodfellow Cambridge Ltd.) and fired at 650° C. to form a continuous conductive track containing Ag paste and Steel powder in a 1:4 ratio.

Example 10

A heater was prepared including insulating substrate C, as shown in FIG. 3. The trench was filled with a conductive organic based paste composed of Ag flake, glass frit (Johnson Matthey Ltd.), and Steel metal powder (Goodfellow Cambridge Ltd.) and fired at 650° C. to form a continuous conductive track containing Ag paste and Steel powder in a 1:3 ratio.

Heating Tests

The heaters prepared in Examples 3 to 10 were each connected to a source of electricity and subjected to airflow testing using a Superflow SF1020PB flowbench supplied by Power Test Inc. set at 20° C., at sea level. The airflow was set to 20 m3 hr-1. After 30 seconds of running at steady state, the electrical power to the heater was switched on and the temperature of the air downstream of the heater was measured over a period of up to 200 seconds. The source of electrical power was either power supply (i): an Isotech IPS603D digital control DC power supply (0-60V, 0-3 A); or power supply (ii) an RS Pro RS3005P digital control DC power supply (0-30V, 0-5 A), which was connected to the protruding connectors using a combination of banana plugs, insulated cable and alligator clips. Temperature measurements were carried out using a Thermosense Type K Input hand-held Thermocouple Indicator.

Figure 10:
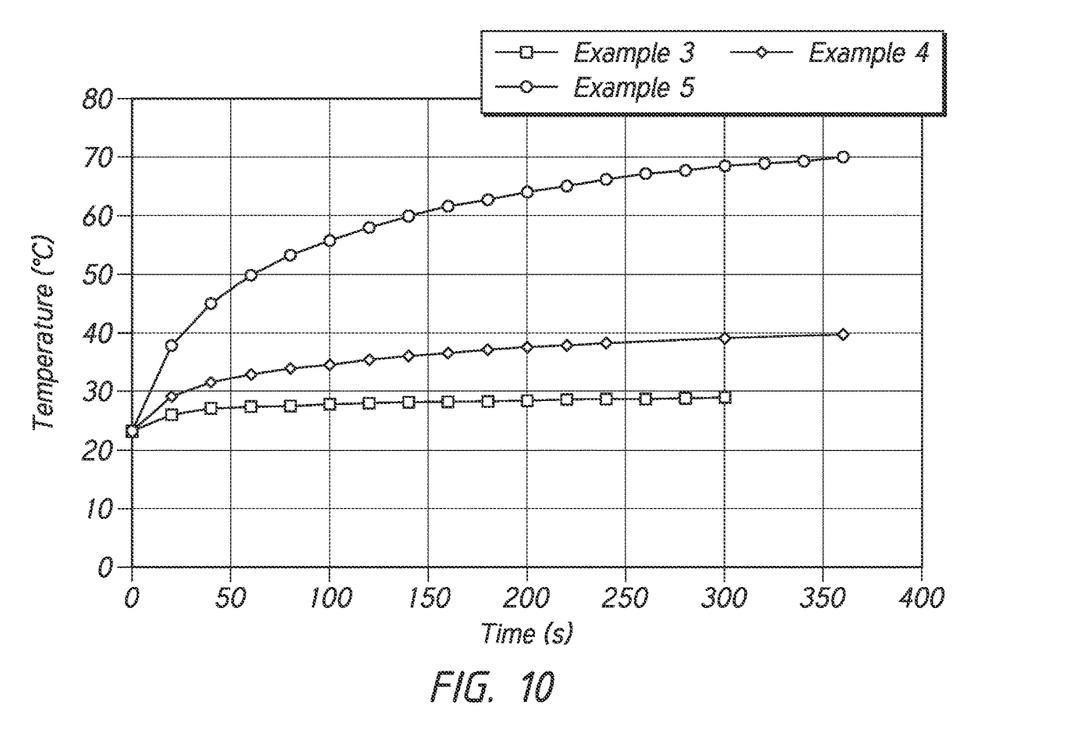
FIGS. 10 and 11 show peak air temperatures achieved by heaters of aspects of the present invention.

FIG. 10 shows the peak air temperature achieved by the heaters of Examples 3, 4, and 5 when powered by power supply (ii) operating at constant power at 1.0 Amp current. The peak temperature attained demonstrates that the resistance heat generated by the heater may vary depending on the composition ratio the paste applied.

Figure 11:
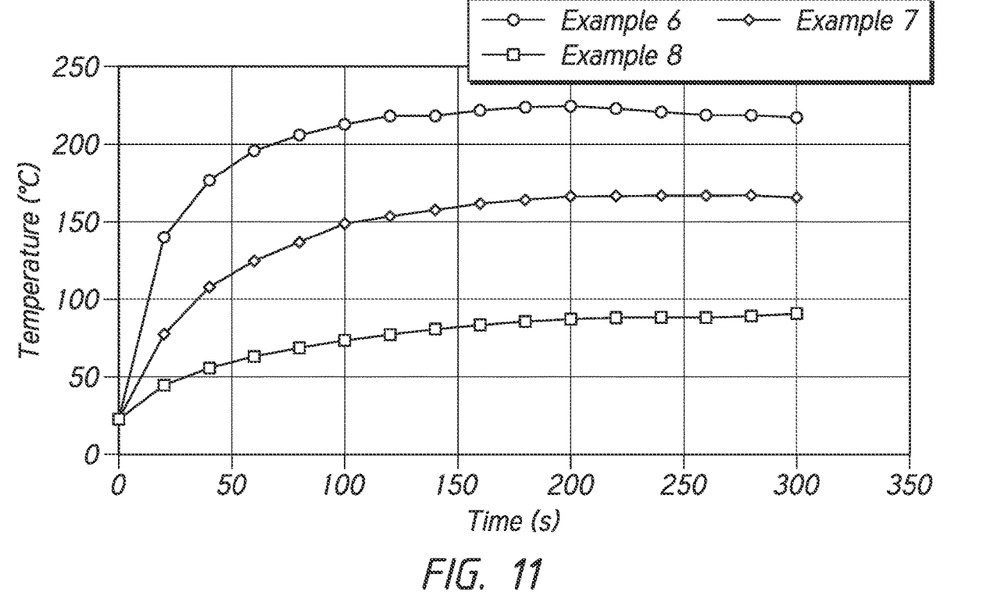

FIG. 11 shows the peak air temperature achieved by the heaters of Examples 6, 7, and 8 when powered by power supply (ii) operating at a constant power supply using 1.0 Amp current. Comparison of Examples of 6, 7, and 8 demonstrates that the resistance heat generated by a given by the paste coating may vary depending on the mass of the paste applied.

Figure 12:
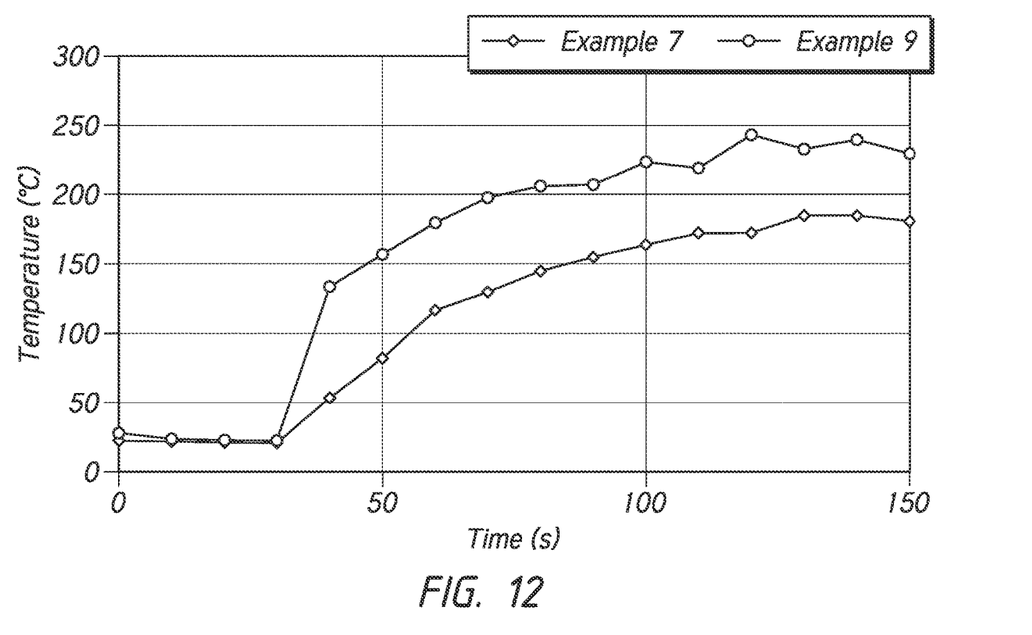
FIGS. 12 and 13 show air temperatures achieved by heaters of aspects of the present invention.

FIG. 12 shows the air temperature achieved by the heaters of Examples 7 and 9 when powered by power supply (ii) operated at a constant power supply of 5 Amps. Comparison of the peak temperatures achieved in FIG. 12 demonstrates that the resistance heat generated by the heater may be varied by varying the metal powder.

Figure 13:
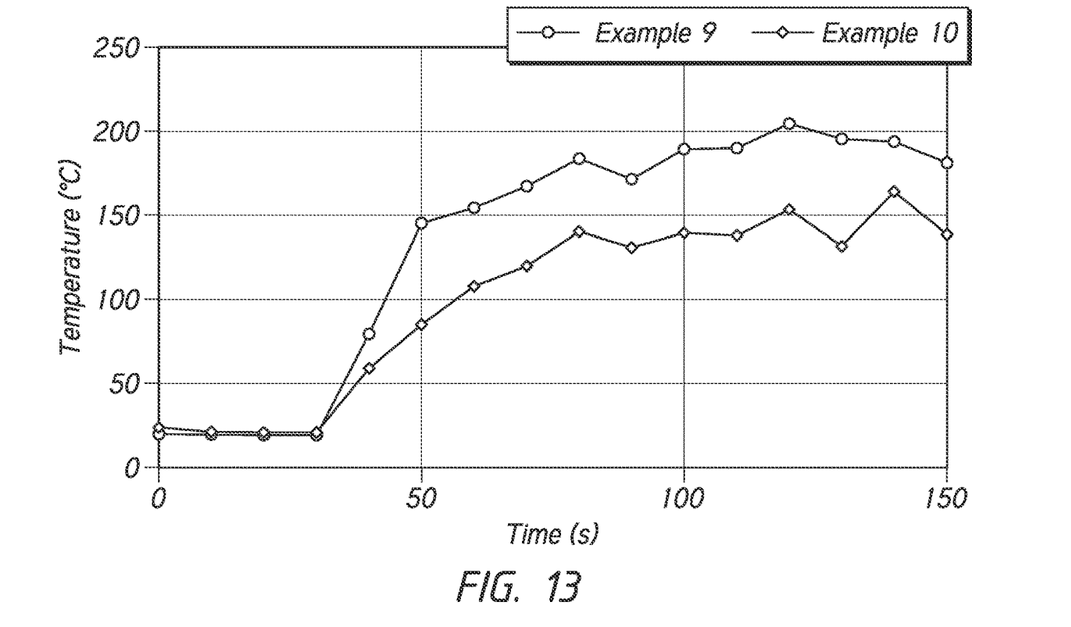

FIG. 13 shows the air temperature achieved by the heaters of Examples 9 and 10 when powered by power supply (ii) operated at a constant power supply of 3 Amps. Comparison of the peak temperatures achieved demonstrates that the resistance heat generated by the heater may be varied by varying the Ag to steel powder ratio.

DPG Tests for Resistive Heaters

Example heater B1 and C1 were tested on a Cambustion DPG, which is a commercially available diesel burner rig usually intended to soot load particulate filters, but can be used simply to generate an electrically- or combustion-heated gas flow. A stainless steel exhaust system comprising a reduction cone and feed pipe mated to a pair of 2 inch V-fittings, was fabricated to hold the prototypes within this rig. One of the V-fittings was bored out so that one of the alumina-based pieces would sit within this cavity. Temperature measurements were carried out using 3 mm Type-K Thermocouples mounted within the rig.

Resistive Heating tests on DPG used a high-current/low voltage commercially available power supply, which was modified at JM to deliver maximum voltage of 48V, maximum current of 320 A, and maximum power of 10 kW. The power supply was connected to the component heater using 95 mm CSA copper cables.

The testing was performed on the DPG rig using a steady state airflow of 120 kghr-1. Electrical power was applied to the heater once a steady flow and temperature had been established. A feed of diesel fuel at 1.1 kghr-1 was supplied to the rig burner, with an initial spark to initiate combustion of diesel. There was a rapid increase in temperature of the gas supplied to the test piece, and then the temperature of the feed gas increased progressively until inlet temperature reaches 300° C., and then electrical power was turned off. This test was performed at a range of electrical powers supplied to the heating experiment is measured in front of and behind the heater. The heating impact generated by the test piece by resistive heating was determined by subtracting the inlet temperature from the outlet temperature.

Figure 14:
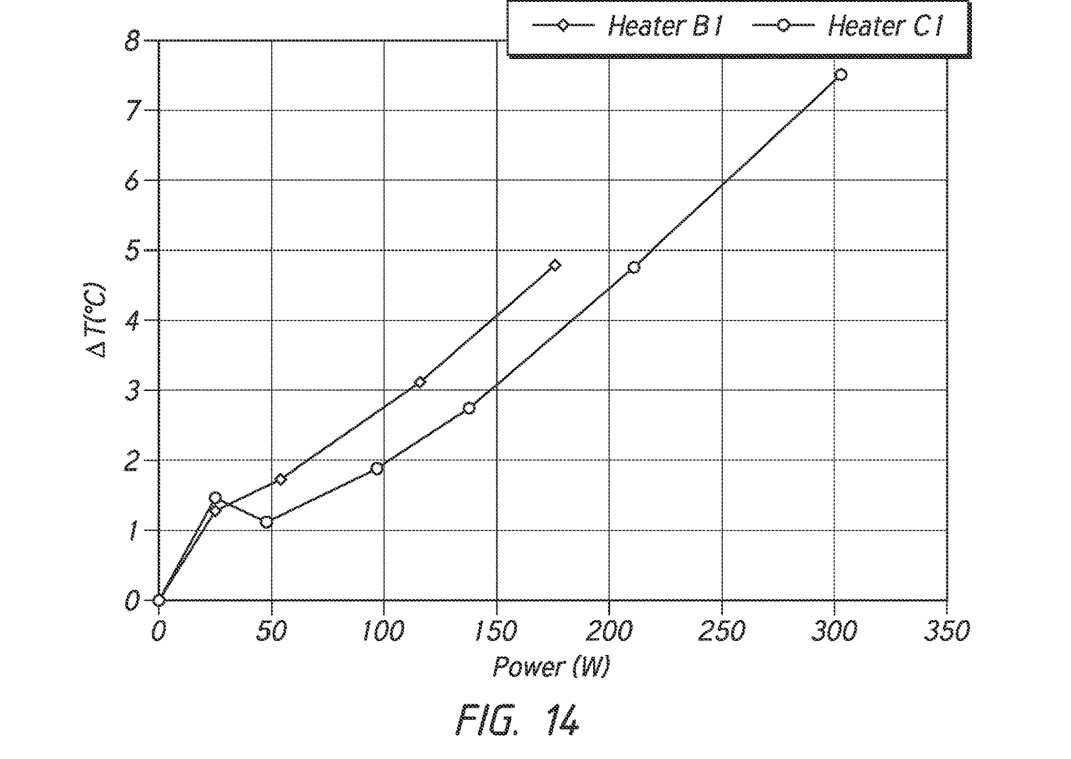
FIG. 14 shows ΔT as a dependent variable against electrical power, for heaters of aspects of the present invention.

Heaters B1 and C1 have been tested at a selection of different electrical power inputs, and the average $\Delta T$ for each test has been calculated. $\Delta T$ may be plotted as the dependent variable against electrical power, as in FIG. 14. All of the tested Examples show resistive heating performance, with Example B1 attaining the highest $\Delta T$ in this work.

Heat Transfer Coefficient Measurements

Figure 15:
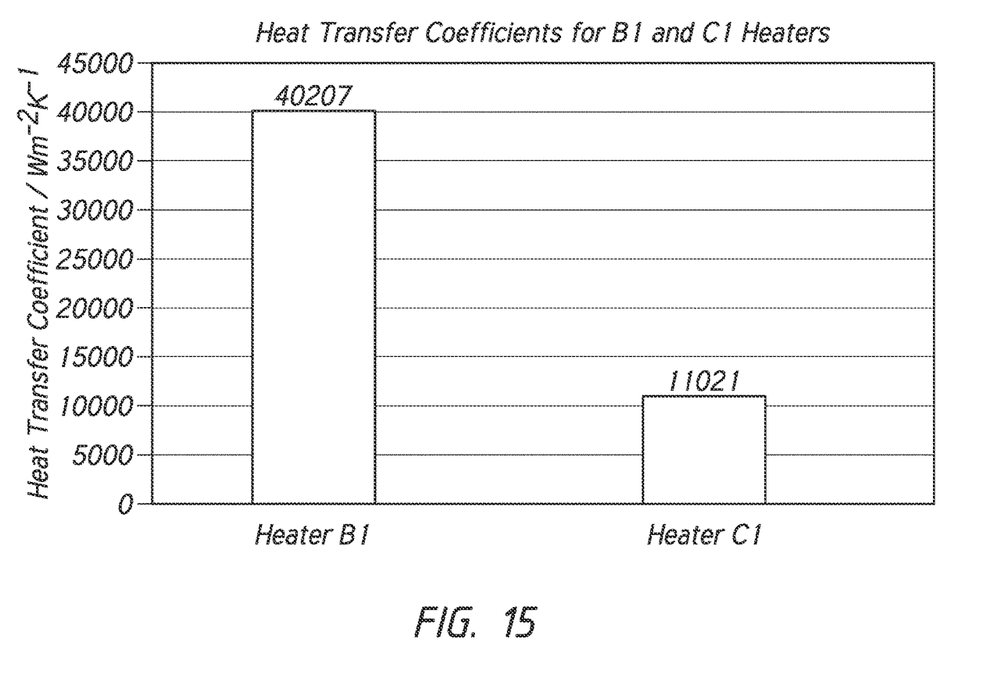
FIG. 15 shows heat transfer coefficients for heaters of aspects of the present invention.

The dependent relationship between $\Delta T$ and power can be used to define a heat transfer coefficient for each of the example resistive heaters. The heat transfer coefficient can be calculated graphically from a plot of dQ/dA (the electrical energy divided by the heater geometric surface area) against $\Delta T$. The gradient of the resulting straight line is the heat transfer coefficient. FIG. 15 shows the heat transfer coefficients calculated for Heater B1 and C1. Heater B1 shows the highest heat transfer coefficient.

The invention claimed is:

1. An apparatus for the catalytic treatment of gas comprising:
   i. a casing having a gas inlet and a gas outlet; and
   ii. a ceramic honeycomb monolith having an inlet end, and outlet end, and a plurality of channels through which gas can flow, and a metallic track coating within a trench manufactured by stereolithography or three-dimensional screen printing, wherein the metallic coating contains at least one platinum group metal (PGM), and wherein the metallic coating is hosted on the ceramic honeycomb monolith disposed within the casing.

2. The apparatus of claim 1, wherein the apparatus is suitable for catalyzing the conversion of one or more of the components of the gas.

3. The apparatus of claim 2, wherein the conversion involves reduction.

4. The apparatus of claim 2, wherein the conversion involves oxidation.

5. The apparatus of claim 2, wherein the PGM is ruthenium or ruthenium alloy.

6. The apparatus of claim 2, wherein the PGM is platinum or platinum alloy.

7. The apparatus of claim 2, wherein the metallic track coating comprises metal on an inlet end surface of the monolith.

8. The apparatus of claim 2, wherein the metallic track coating comprises metal on an outlet end surface of the monolith.

9. The exhaust gas heater of claim 1, wherein the substrate has a tubular shape.

10. The exhaust gas heater of claim 1, wherein the substrate has a cylindrical shape.

11. A method of treating a gas comprising passing the gas through the apparatus of claim 1.

12. The method of claim 11, wherein the gas comprises a hydrocarbon.

* * * * *